United States Patent
Kaushik et al.

(10) Patent No.: US 10,236,953 B2
(45) Date of Patent: Mar. 19, 2019

(54) PACKET CAPTURE GROUPING FOR MU-MIMO (MULTI-USER / MULTIPLE INPUT—MULTIPLE OUTPUT) ACCESS POINTS

(71) Applicant: Fortinet, Inc., Sunnyvale, CA (US)

(72) Inventors: Anil Kaushik, Marathalli (IN); Pradeep Mohan, Binnamangala (IN); PC Sridhar, Binnamangala (IN)

(73) Assignee: Fortinet, Inc., Sunnyvale, CA (US)

( * ) Notice: Subject to any disclaimer, the term of this patent is extended or adjusted under 35 U.S.C. 154(b) by 5 days.

(21) Appl. No.: 15/476,825

(22) Filed: Mar. 31, 2017

(65) Prior Publication Data
US 2018/0287672 A1    Oct. 4, 2018

(51) Int. Cl.
| | | |
|---|---|---|
| *H04L 12/24* | (2006.01) | |
| *H04W 24/10* | (2009.01) | |
| *H04W 48/16* | (2009.01) | |
| *H04B 7/0452* | (2017.01) | |
| *H04W 84/12* | (2009.01) | |
| *H04W 88/08* | (2009.01) | |

(52) U.S. Cl.
CPC ....... *H04B 7/0452* (2013.01); *H04L 41/0803* (2013.01); *H04W 24/10* (2013.01); *H04W 48/16* (2013.01); *H04W 84/12* (2013.01); *H04W 88/08* (2013.01)

(58) Field of Classification Search
CPC .. H04B 7/0452; H04L 41/0803; H04W 24/10; H04W 48/16; H04W 88/08
See application file for complete search history.

(56) References Cited

U.S. PATENT DOCUMENTS

2018/0054724 A1*    2/2018    Cariou ................. H04W 8/005

* cited by examiner

*Primary Examiner* — Chandrahas B Patel
(74) *Attorney, Agent, or Firm* — Law Office of Dorian Cartwright; Dorian Cartwright (57) ABSTRACT

An access packet group is formed for packet capture of MU-MIMO capable access points. A neighbor list for a plurality of access points discovered by an access point is received. The access point has MU-MIMO capability for multiple concurrent streams of data with multiple clients. A frame report is received from the access point of RSSI values for the plurality of access points on the neighbor list. A group of access points is selected from the plurality of access points to switch into packet capture mode, based on RSSI values. The group of access points is configured into packet capture mode.

6 Claims, 5 Drawing Sheets

PACKET CAPTURE GROUPING FOR MU-MIMO (MULTI-USER / MULTIPLE INPUT—MULTIPLE OUTPUT) ACCESS POINTS

FIELD OF THE INVENTION

The invention relates generally to computer networking, and more specifically, to capturing packets with grouping for MU-MIMO access points.

BACKGROUND

Wireless networking capabilities have consistently improved. One of the more recent Wi-Fi developments is MU-MIMO (multi-user/multiple input-multiple output) which was codified as part of the IEEE 802.11ac standard promulgated by the Instituted of Electrical and Electronics Engineers. In more detail, MU-MIMO now allows access points to maximize the benefits of MIMO technology with the ability to communicate with up to 4 clients concurrently at a high speed with beamforming. The clients require a certain physical separation to avoid interference. This feature is for downstream communications of network packets from an access point to a station.

Packet capture is used for troubleshooting issues in a wireless network. The issues range from connectivity (e.g., loss of connectivity, intermittent re-connections), performance (e.g., low speed for certain stations), authentication, and coverage. Conventionally, a listening device placed between an access point and a station was able to sufficiently capture packets for analysis.

However, with MU-MIMO data streams being sent concurrently, and also being spatially separate, makes it difficult if not impossible to sample packets from 4 stations concurrently.

Therefore, what is needed is a robust technique for dynamically forming packet capture groups for capturing packets from a MU-MIMO capable access point.

SUMMARY

These shortcomings are addressed by the present disclosure of methods, computer program products, and systems for capturing packets with grouping for MU-MIMO access points.

In one embodiment, a controller manages a plurality of access points and thereby can organize access points from a higher level. The controller receives a neighbor list for a plurality of access points discovered by an access point is received. The access point has MU-MIMO capability for multiple concurrent streams of data with multiple clients. A frame report is received from the access point of RSSI values for the plurality of access points on the neighbor list.

In another embodiment, a group of access points is selected from the plurality of access points to switch into packet capture mode, based on RSSI values. The group of access points is configured into packet capture mode.

Advantageously, network performance is improved for packet collection operations. Furthermore, network performance issues can be more accurately diagnosed and addressed.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for capturing packets with grouping for MU-MIMO access points. One of ordinary skill in the art will recognize many additional variations made possible by the succinct description of techniques below.

Figure 1:
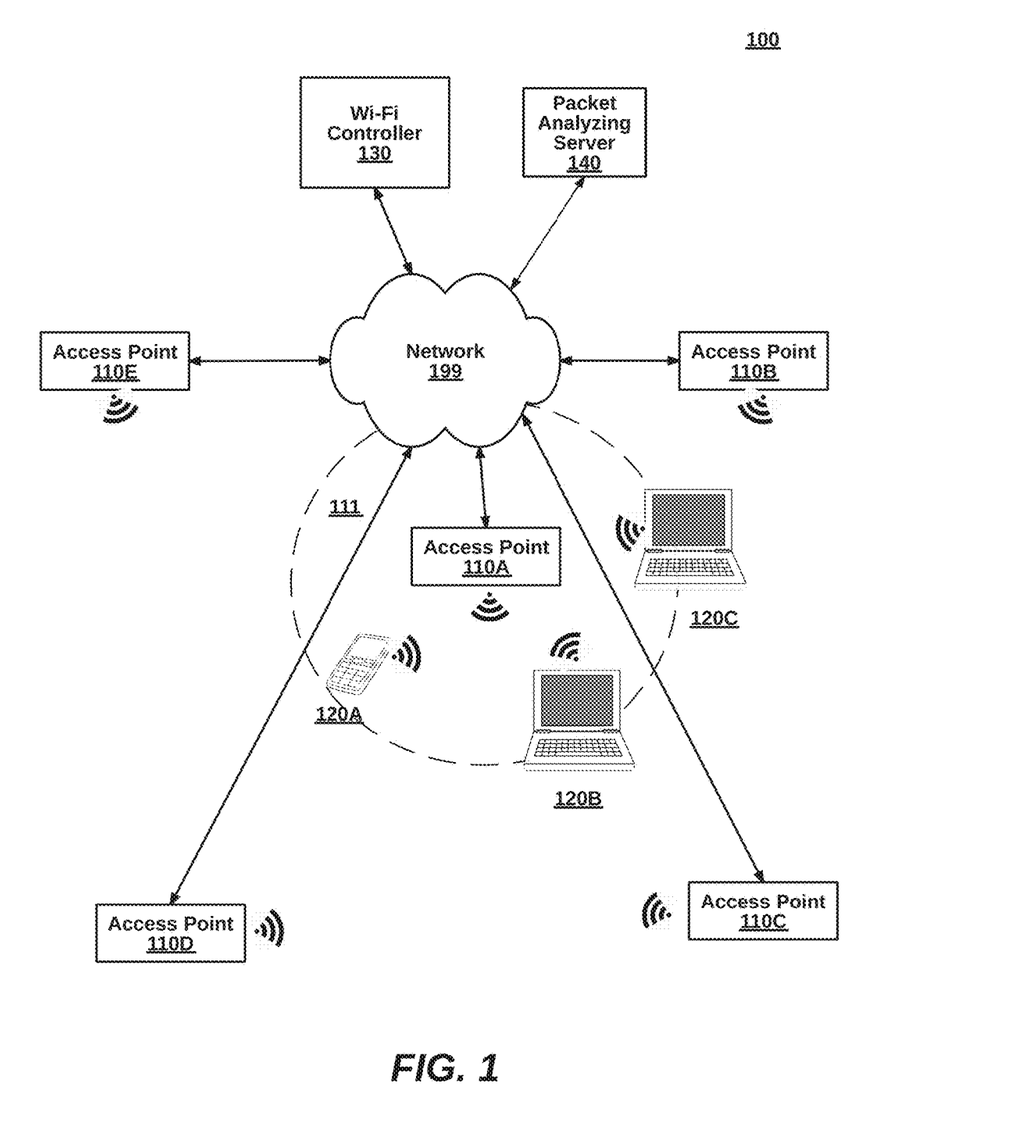
FIG. 1 is a high-level block diagram illustrating a system for capturing packets with grouping for MU-MIMO access points, according to one embodiment.
Figure 2:
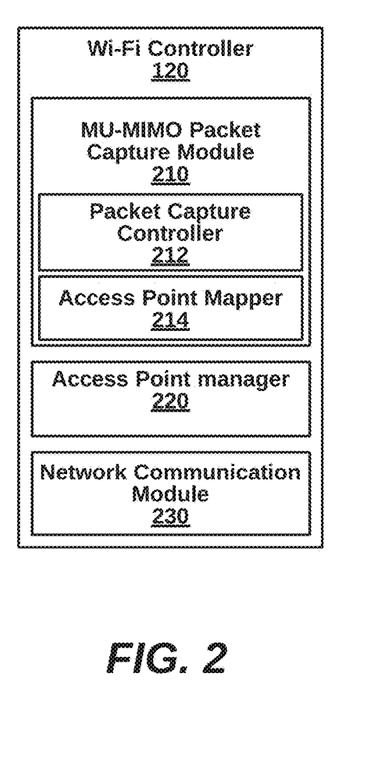
FIG. 2 is a more detailed block diagram illustrating a Wi-Fi controller of the system of FIG. 1, respectively, according to one embodiment.
Figure 3:
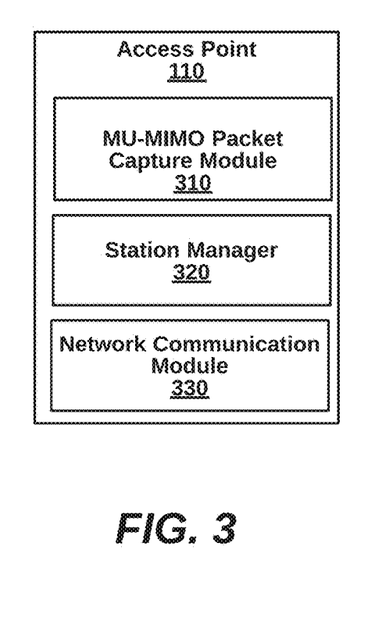
FIG. 3 is a more detailed block diagram illustrating an access point of the system of FIG. 1, respectively, according to one embodiment.

Systems for MU-MIMO Packet Capture (FIG. 1-3)

FIG. 1 is a high-level block diagram illustrating a system 100 for capturing packets with grouping for MU-MIMO access points, according to one embodiment. The system 100 includes access points 110A-E, stations 120A-C, Wi-Fi controller 130 and packet analyzing server 140. Many other embodiments are possible, for example, with more access points, more or fewer stations, additional components, such as firewalls, routers, switches, and the like. For example, in some embodiments of the system 100, one or more of the access points A-E is substituted with a packet listening device that does not also have access point capabilities.

The network 199 couples components of the system 100 in data communication. The access points 110A-E are preferably connected to the network 199 via hardwire. The stations 120A-C are wirelessly connected to the access point 110A to access the network 199 indirectly. The Wi-Fi controller 130 and the packet analyzer server 140 are also coupled to the network 199 through a wired or wireless media. The network 199 can be a data communication network such as the Internet, a WAN, a LAN, can be a cellular network, or a hybrid of different types of networks. Thus, the system 100 can be a LAN or include cloud-based devices.

In one embodiment, Wi-Fi controller 130 configures the access points 110B-E (or other packet capturing devices) to capture packets for the access point 110A. Results can be sent to the packet analyzer server 140 for analysis. In more detail, the Wi-Fi controller 130 periodically receives frame reports from the access points 110A-E indicating an RSSI strength of access point neighbors. For example, the access point 110A sends a frame report indicating RSSI strengths for each of 110B-E because each are within range. By contrast, the access point 110B may have just the access point 110A in a frame report, or the access point 110C may also be within rang. But the access points 110D,E are now within range, in this particular example. The frame report can change over time as more or less interference is present at different times.

The Wi-Fi controller 130 selects a group of access points 110B-E, based on the frame reports, for packet capture of the access point 110A because of MU-MIMO transmissions. As a result, the access point 110A can transmitted concurrently up to four stations with separate data streams. The access point group can each cover one of the wireless stations, in one case. In another case, the access point group each listen to capture all nearby packets, regardless of a wireless station source. With enough listener samples, the aggregate coverage of packets captures may not be 100%, but may not need to be. Besides RSSI range, the group can also be formed based on spatial coordinates. The spatial coordinates provide an optimal physical coverage of the range. Another factor for group formation includes network traffic load. In times of higher traffic, there may only be two or three access points available to go off-line into packet capture mode without disrupting overall network performance beyond tolerance.

Once the packet collection period has expired, the Wi-Fi controller 130 dismantles the access point group. One implementation creates the access point for a predetermined amount or time, or for collecting a predetermined number of network packets (e.g., as a whole, or from a particular source or destination), before the access point group automatically dismantles. In an implementation, a certain operating system command is sent from the Wi-Fi controller 130 to the access point group which controls whether each individual access point should be in normal access point mode, or in packet capture mode.

In one embodiment, the Wi-Fi controller 130 also manages multiple access points and stations on the network 199. For example, network packets of a new session are forwarded to the Wi-Fi controller 130 from the access point 110. The Wi-Fi controller 130 may recognize a certain application, or certain flow that has specialized rules or policy applications. Other tasks of the Wi-Fi controller 130 can include managing SSID assignments and hand-offs, implementing system-wide Wi-Fi policies, load balancing, managing a number of station connections at a particular access point, and the like. More detailed embodiments of the Wi-Fi controller 130 are set forth below with respect to FIG. 2.

In one embodiment, the access points 110A-E can operate in dual mode, alternating between normal access point mode and packet capture mode. As described, in packet capture mode, an access point listens for generating a frame report of neighboring access point RSSI values. Also, the access point can listen for packets and send a copy of all packets upstream to the packet analyzing server 130. In some instances, the access point pre-processes packets by only sending those that meet certain conditions (e.g., from a particular source, to a particular destination, have certain characteristics, compliant with certain protocols, transmitted at a certain time, above an preconfigured RSSI level, and the like).

In normal access point mode, in an embodiment, the access points 110A-E periodically send beacons with embedded SSIDs (service set identifiers) to advertise network presence to stations within radio range. Stations connect to the SSID and begin exchanging data with the network 199. The stations 120A-C are sometimes mobile and, as a result, are handed off to and from neighboring access points. Once connected, the access points 110A-E process and forward network packets exchanged with stations 120A-C and the network 199. In one data path, network packets are sent upstream to an external resource.

In another data path, network packets are sent downstream (e.g., in response to upstream packets) from the external resource.

Other embodiments of the access points 110A-E can leave one or more access points permanently in packet capture mode. More detailed embodiments of the access points 110A-E are set forth below with respect to FIG. 3.

The stations 120A-C are shown to be within radio range 111 associated with the access point 110A. Based on spacing, different access points have access to a radio range of the stations 110A-C in order to pick up on packets being sent to and received from the access point 110A. In some embodiments, are oblivious to the access point groupings and mode switches. However, the stations 120A,B do benefit from higher security and performance of the network 199. The stations 120A-C can be wireless devices carried by employees of a company or by family members in a household. The stations 120A-C may experience reduced radio coverage for hand-offs while some access points are off-line. Also, some stations may be forcefully handed-off to open up an access point for switching from normal access point mode to packet capture mode.

The packet analyzing server 140 inspects the packets to inspect various conditions. For example, a security operation can check packets for indications of rogue access points or rogue wireless stations. The packets can also be inspected for viruses. Deep packet inspection can be performed to identify applications layer sources of data in the packets. Many other examples are possible. In one embodiment, the packet analyzing server 140 comprises a Wireshark station to identify reasons for poor network performance. Network administrators can view reports in determining how to remediate any issues. In some implementations, remediation actions are automatically performed according to a rule set.

Figure 6:
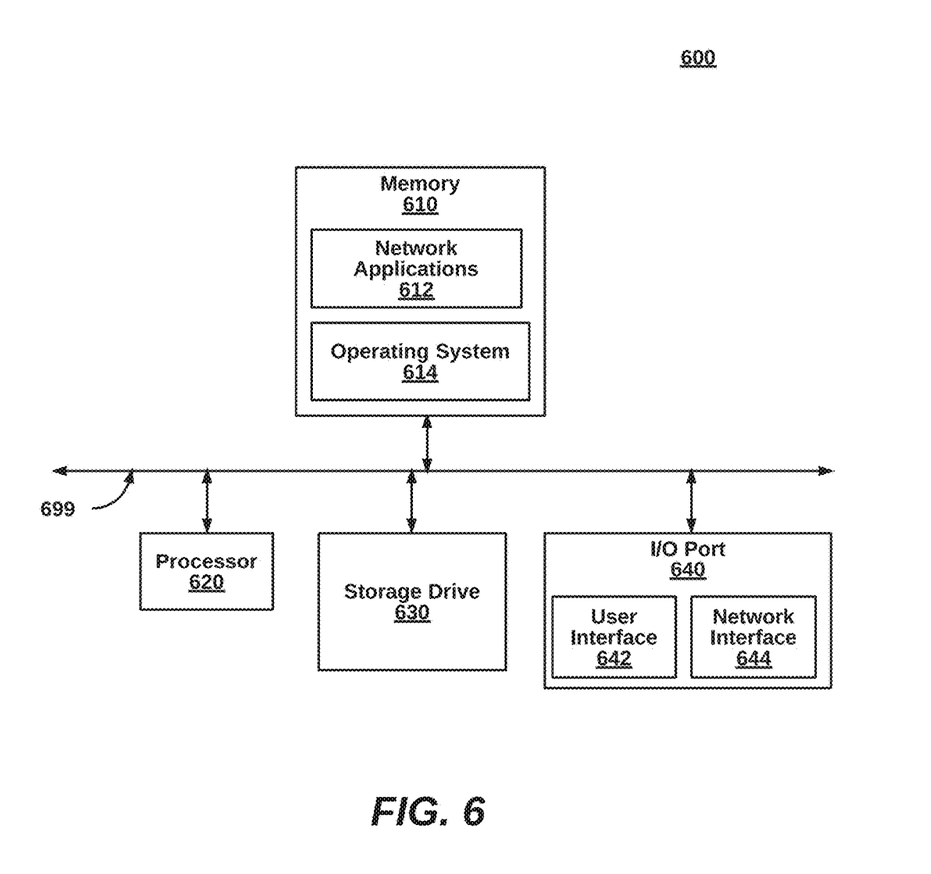
FIG. 6 is a block diagram illustrating an example computing device, according to one embodiment.

The network components of the system 100 can implemented in any of the computing devices discussed herein, for example, a personal computer, a laptop computer, a tablet computer, a smart phone, a mobile computing device, a server, a cloud-based device, a virtual device, an Internet appliance, or any of the computing devices described herein, using hardware and/or software (see e.g., FIG. 6).

FIG. 2 is a more detailed block diagram illustrating a Wi-Fi controller 130 of the system of FIG. 1, respectively, according to one embodiment. The Wi-Fi controller 130 comprises a packet capture module 210, an access point manager 220, and a network communication module 230. The components can be implemented in hardware, software, or a combination of both.

The packet capture module 210 includes a packet capture controller 212 to manage packet capture processes. One or more packet capture operations can take place at any particular time. An access point mapper 214 tracks relative locations of access points and other packet capture devices.

A profile can be generated for each access point for reference, including whether an access point has MU-MIMO radio transmissions. If so, an access point group is formed for better coverage of packets. Network administrator can make packet capture configurations via a user interface or command line interface accessed via wire connection or mobile app. In one case, the packet analyzing server 140 is given permission to make configuration changes, as needed.

The access point manager 220 communicates with the access point 110 and other access points for Wi-Fi functionality such as beaconing, assigning BSSIDs, and handing-off stations between access points.

The network communication module 230 can provide network protocol services and lower layer services. Applications or the operating system of the Wi-Fi controller 130 sends higher layer data to the network communication module 230 for packetizing according to Ethernet or other protocols, and uses transceivers with modulators and drivers to exchange data with a physical medium.

FIG. 3 is a more detailed block diagram illustrating an access point 120 (representative of access points 120A-E) of the system of FIG. 1, respectively, according to one embodiment. The access point 110 includes an MU-MIMO packet capture module 310, a station manager 320, and a network communication module 330.

The MU-MIMO packet capture module 310 switches modes between normal access point mode and packet capture mode. Further, when in packet capture mode, the packet capture module 310 snoops one or more channels listening for packets transmitted from sources and received by destinations. In some embodiments, the packet capture module 310 pre-processes the capture packets prior to forwarding to the packet analyzing server 140.

The station manager 320 tracks stations registered with an SSID of the access point 110. A table can store MAC addresses of each station so that network packets can be routed to and from connected stations. Network packets from MACs that are not part of the table can be ignored. In some embodiments, the Wi-Fi controller 130 sends commands for station management that are implemented by the access point 110.

The network communication module 330 of the access point 120 can be similar to the network communication module 230 of the Wi-Fi controller 110, including transceivers and other level protocol services. To enable Wi-Fi communication, a Wi-Fi transceiver provides radio and antennae communications.

II. Methods for MU-MIMO Packet Capture (FIG. 4-5)

Figure 4:
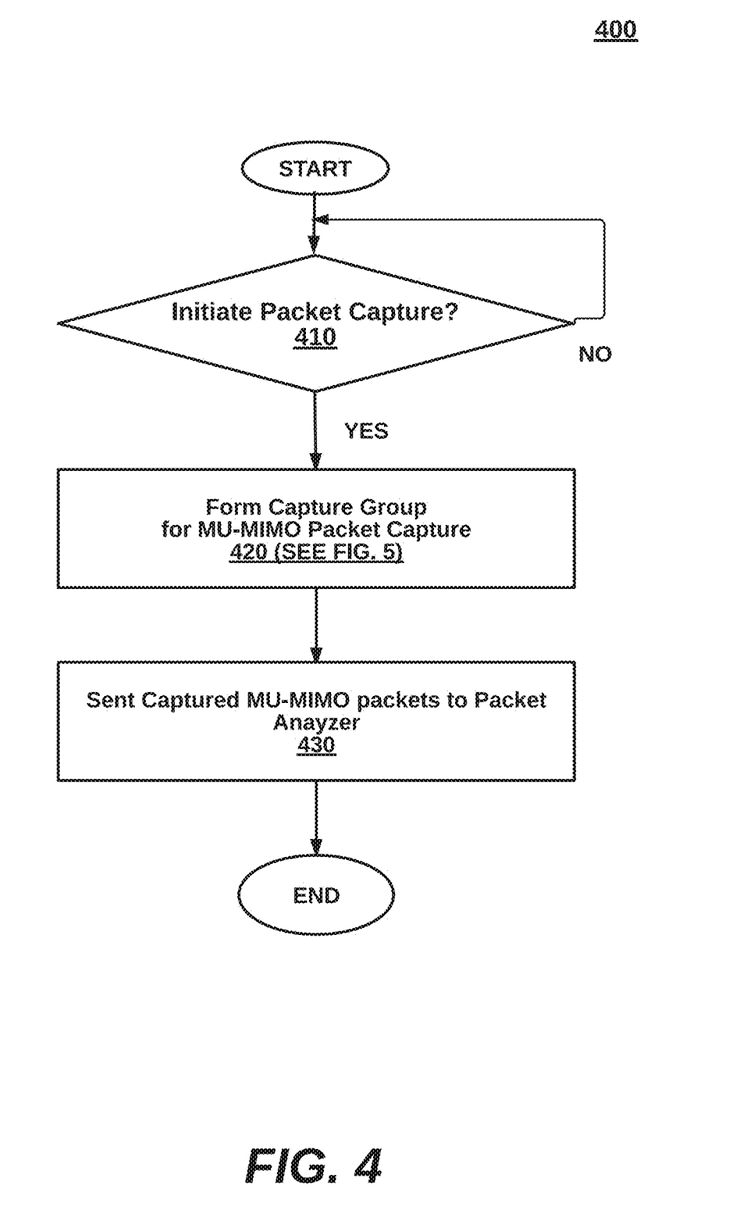
FIG. 4 is a high-level flow diagram illustrating a method for capturing packets with grouping for MU-MIMO access points, according to one embodiment.
Figure 5:
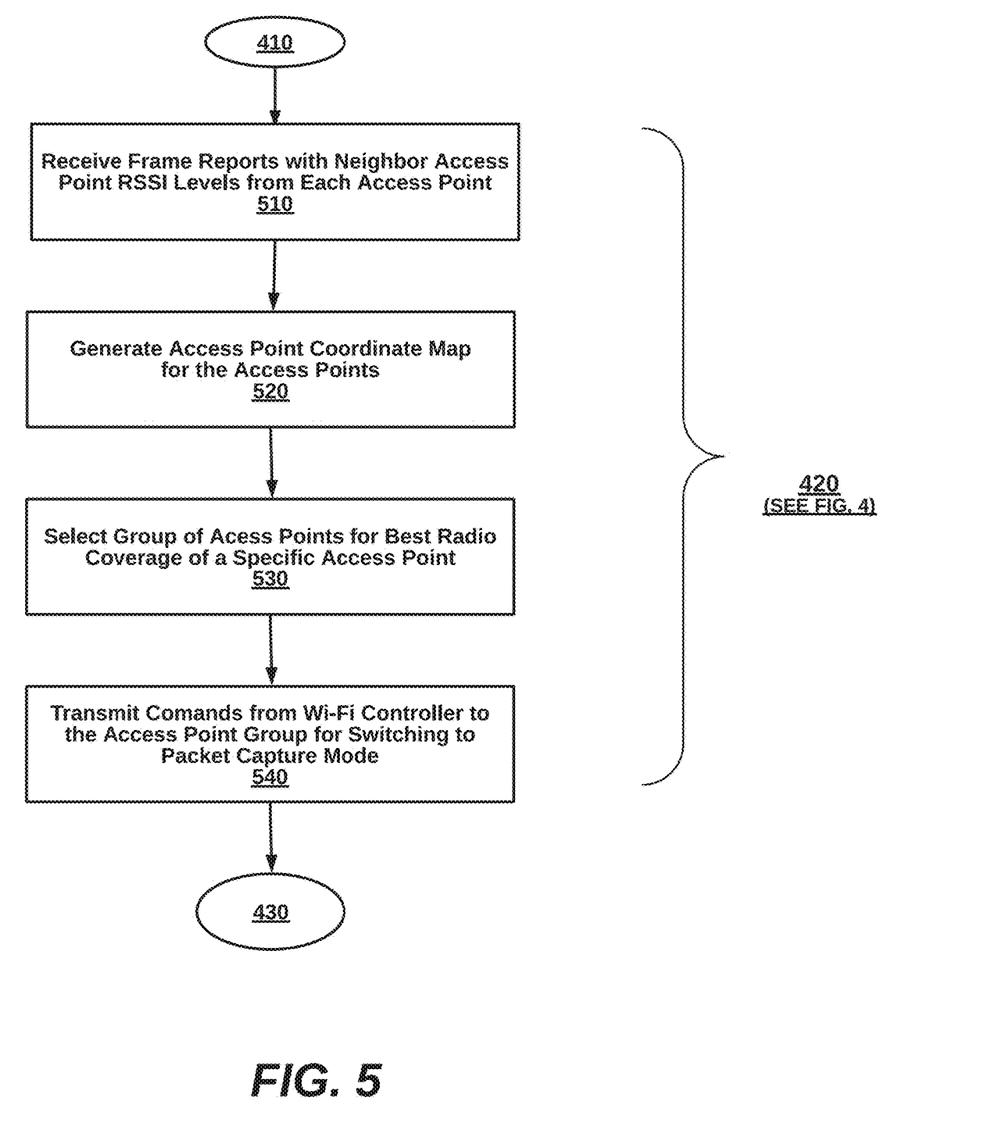
FIG. 5 is more detailed flow diagram illustrating a step of creating a packet capture group in the method of FIG. 4, according to one embodiment.

FIG. 4 is a high-level flow diagram illustrating a method for capturing packets with grouping for MU-MIMO access points, according to one embodiment. The method 400 can be implemented, for example, by the system 100 of FIG. 1. The steps are merely representative groupings of functionality, as there can be more or fewer steps, and the steps can be performed in different orders.

At step 410, a Wi-Fi controller determines that it is necessary to capture packets for a MU-MIMO access point. For example, a network administrator can manually activate packet capture. In another example, network conditions can automatically trigger packet capture.

At step 420 a packet capture group is formed for the MU-MIMO access point. More detailed embodiments of the packet capture group formation step are discussed below with reference to FIG. 5.

At step 430 captures packets are sent to a packet analyzing server for remediation based on packet analysis of packets from different streams of the MU-MIMO access point.

FIG. 5 is more detailed flow diagram illustrating the step of grouping for packet capture in the method of FIG. 4, according to one embodiment.

At step 510, frame reports with neighbor access point RSSI levels is received from each access point.

At step 520, an access point coordinate map is generated from coordinate data for each access point. The coordinates can be manually entered in some cases. In other cases, coordinates are estimated from triangulation of RSSI values, for example.

At step 530, a group of access points within range are selected for best radio coverage. In one embodiment, physical coordinates or a network map is taken into consideration for selections that have enough spatial separation. In another embodiment, potential degradation of network performance by taking access points offline for packet capture is another factor used for selecting access points of a particular group. In still another embodiment, a pure packet capture device that is not an access point can be deployed for MU-MIMO packet capture.

At step 540, commands are transmitted from a Wi-Fi controller to the access point group for switching to packet capture mode. The command can be to start or stop packet capture.

III. Generic Computing Device (FIG. 6)

FIG. 6 is a block diagram illustrating an example computing device 600 for use in the system 60 of FIG. 1, according to one embodiment. The computing device 600 is implementable for each of the components of the system 100. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method, in a Wi-Fi controller on a data network, for capturing packets with grouping for MU-MIMO (multi-user multi-input/multi-output) access points using capture groups, the method comprising the steps of:

receiving a neighbor list for a plurality of access points discovered by an access point, the access point having MU-MIMO capability for multiple concurrent streams of data with a multiple clients;

receiving a frame report from the access point of RSSI (received signal strength indicator) values for the plurality of access points on the neighbor list;

selecting a group of access points from the plurality of access points to switch into packet capture mode, based on RSSI values; and configuring the group of access points into packet capture mode including transmitting a command to each access point of the access point group, wherein the command switches each of the access points from normal access point mode into packet capture mode.

2. The method of claim 1, further comprising:

determining physical coordinates of the plurality of access points, wherein the step of selecting the group of access points from the plurality of access points comprises selecting the group of access points for switching into capture mode based on physical coordinates of the group of access points that correspond to physical coordinates of the access point.

3. The method of claim 1, further comprising:

determining current traffic conditions associated with the plurality of access points, wherein the step of selecting the group of access points from the plurality of access points for switching into capture mode based on traffic conditions associated with the access point group.

4. The method of claim 1, further comprising:

transmitting a second command to each access point of the access point group, wherein the second command switches each of the access points from packet capture mode into normal access point mode.

5. A Wi-Fi controller on a data network, for capturing packets with grouping for MU-MIMO (multi-user multi-input/multi-output) access points using capture groups, the Wi-Fi controller comprising:

a processor;

a memory; and a communication interface to receive a neighbor list for a plurality of access points discovered by an access point, the access point having MU-MIMO capability for multiple concurrent streams of data with multiple clients, the communication interface to receive a frame report from the access point of RSSI (received signal strength indicator) values for the plurality of access points on the neighbor list; and a packet capture module to select a group of access points from the plurality of access points to switch into packet capture mode, based on RSSI values, the packet capture module to configure the group of access points into packet capture mode including transmitting a command to each access point of the access point group, wherein the command switches each of the access points from normal access point mode into packet capture mode.

6. A non-transitory computer-readable media storing source code that, when executed by a processor, performs a computer-implemented method, in a Wi-Fi controller on a data network, for capturing packets with grouping for MU-MIMO (multi-user multi-input/multi-output) access points using capture groups, the method comprising the steps of:

receiving a neighbor list for a plurality of access points discovered by an access point, the access point having MU-MIMO capability for multiple concurrent streams of data with multiple clients;

receiving frame report from the access point of RSSI (received signal strength indicator) values for the plurality of access points on the neighbor list;

selecting a group of access points from the plurality of access points to switch into packet capture mode, based on RSSI values; and configuring the group of access points into packet capture mode including transmitting a command to each access point of the access point group, wherein the command switches each of the access points from normal access point mode into packet capture mode.

* * * * *